(12) United States Patent
Kondo (10) Patent No.: US 7,916,936 B2
(45) Date of Patent: Mar. 29, 2011

(54) IMAGE-PROCESSING METHOD (75) Inventor: Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1223 days.

(21) Appl. No.: 11/512,262

(22) Filed: Aug. 30, 2006

(65) Prior Publication Data

US 2007/0047835 A1 Mar. 1, 2007

(30) Foreign Application Priority Data

Aug. 30, 2005 (JP) ................ P2005-250366

(51) Int. Cl.
*G06K 9/00* (2006.01)
*G06K 9/40* (2006.01)
*H04N 5/217* (2006.01)
(52) U.S. Cl. ............... 382/162; 382/275; 348/241
(58) Field of Classification Search ............ 382/275
See application file for complete search history.

(56) References Cited

U.S. PATENT DOCUMENTS

| | | | |
|---|---|---|---|
| 5,536,541 A | 7/1996 | Armellini | |
| 5,539,541 A | 7/1996 | Ushida | |
| 6,965,416 B2 | 11/2005 | Tsuchiya et al. | |
| 7,010,160 B1* | 3/2006 | Yoshida | 382/162 |
| 7,127,122 B2 | 10/2006 | Ogata et al. | |
| 2003/0095197 A1* | 5/2003 | Wheeler et al. | 348/241 |
| 2004/0136604 A1* | 7/2004 | Kuwata et al. | 382/254 |

FOREIGN PATENT DOCUMENTS

| | | |
|---|---|---|
| JP | 5-136998 | 6/1993 |
| JP | 2001-275015 | 10/2001 |
| JP | 2003-008935 | 1/2003 |

OTHER PUBLICATIONS

Japanese Office Action, with English Abstract, issued in Japanese Patent Application No. 2005-250366, dated on Dec. 18, 2008.
Y. Takematsu et al., "Improvement of Image Quality using Retinex Theory Based on the Statistical Image Evaluation", The Journal of the Society of Photographic Science and Technology of Japan, 2004, p. 410-416, vol. 67. No. 4.
M. Elad, "Retinex by Two Bilateral Filters", The 5th International Conference on Scale-Space and PDE in Computer vision, 2005.
Japanese Office Action, with English Abstract, issued in Japanese Patent Application No. 2005-250366, dated on Dec. 18, 2008.

* cited by examiner

*Primary Examiner* — Bhavesh M Mehta
*Assistant Examiner* — Hadi Akhavannik
(74) *Attorney, Agent, or Firm* — Baker Botts L.L.P.

(57) ABSTRACT

An image-processing method includes: subjecting original image data indicative of an original image to a selective noise reduction by reducing noise from pixel data that meets a prescribed condition among all the pixel data in the original image data; and performing a first calibration to calibrate contrast of a backlight region of the selectively-noise-reduced original image data to generate an output image by determining a first pixel component and a second pixel component for each pixel data in the selectively-noise-reduced image data, by increasing contrast of the second pixel component, and by recreating pixel data based on the first pixel component and the calibrated second pixel component.

16 Claims, 9 Drawing Sheets

| | | | | |
|---|---|---|---|---|
| 0.0030 | 0.0133 | 0.0219 | 0.0133 | 0.0030 |
| 0.0133 | 0.0596 | 0.0983 | 0.0596 | 0.0133 |
| 0.0219 | 0.0983 | 0.1621 | 0.0983 | 0.0219 |
| 0.0133 | 0.0596 | 0.0983 | 0.0596 | 0.0133 |
| 0.0030 | 0.0133 | 0.0219 | 0.0133 | 0.0030 |

IMAGE-PROCESSING METHOD

CROSS REFERENCE TO RELATED APPLICATION

This application claims priority from Japanese Patent Application No. 2005-250366 filed Aug. 30, 2005, the entire content of which is incorporated herein by reference.

TECHNICAL FIELD

The disclosure relates to an image-processing method for calibrating portions of image data having low image quality, such as backlight regions of an image.

BACKGROUND

When photographing a subject into the sunlight, the subject portion of the image is referred to as a backlight image in which the lightness and contrast are too low to distinguish details in the image. Image processing it performed on such backlight images to improve image quality by increasing the lightness and contrast in the image. This type of image processing is not only performed on backlight images, but also poor quality images resulting from underexposure, shaking or blurring during photographing, noise, and insufficient light. One technique of this type of image processing that is well known in the art is the retinex process as described in "Improvement of Image Quality Using Retinex Theory based on Statistical Image Evaluation" by Yuki Takematsu, Journal of Photographic Science and Technology of Japan, Vol. 67, No. 4, pp 410-416, 2004.

The retinex process improves the image quality primarily of low quality image portions of inputted image data, while saving the high-quality image portions. In the retinex process, a Gaussian filter is used to calibrate pixel data in the original image to values reflecting pixel data in surrounding pixels, calculates reference component data of the original image from the natural logarithm of the calibrated pixel data, and calculates illuminance component data by dividing the pixel data of the original image by the reference component data. Thus, the retinex process divides the original image into the reference component data and the illuminance component data. Then, the retinex process performs gamma correction on the calculated illuminance component data to calibrate lightness and tone (contrast). By subsequently combining the calibrated illuminance component data and the reference component data, the retinex process can generate image data with improved image quality in the low quality portions of the original image, such as backlight regions of the image.

SUMMARY

However, low quality image regions such as backlight regions often include noise. Improving the image quality in these low quality image regions using the retinex process amplifies the signal intensity of the image data in these regions, thereby increasing the contrast and lightness of the low quality image regions. At the same time, however, the retinex process exposes and amplifier hidden noise so that the noise is emphasized.

In other words, noise is amplified as contrast and lightness are increased to improve image quality in low quality image regions.

In view of the foregoing, it is an object of the invention to provide an image-processing method capable of calibrating low quality regions of image data, such as backlight regions in an image, and capable of reducing noise in the calibrated image.

In order to attain the above and other objects, the invention provides an image-processing method, including: subjecting original image data indicative of an original image to a selective noise reduction by reducing noise from pixel data that meets a prescribed condition among all the pixel data in the original image data; and performing a first calibration to calibrate contrast of a backlight region of the selectively-noise-reduced original image data to generate an output image by determining a first pixel component and a second pixel component for each pixel data in the selectively-noise-reduced image data, by increasing contrast of the second pixel component, and by recreating pixel data based on the first pixel component and the calibrated second pixel component.

According to another aspect, the invention provides a storage medium storing a set of program instructions executable on a data processing device and usable for image-processing, the set of instructions including: subjecting original image data indicative of an original image to a selective noise reduction by reducing noise from pixel data that meets a prescribed condition among all the pixel data in the original image data; and performing a first calibration to calibrate contrast of a backlight region of the selectively-noise-reduced original image data to generate an output image by determining a first pixel component and a second pixel component for each pixel data in the selectively-noise-reduced image data, by increasing contrast of the second pixel component, and by recreating pixel data based on the first pixel component and the calibrated second pixel component.

DETAILED DESCRIPTION

An image-processing method according to some aspects of the invention will be described while referring to the accompanying drawings wherein like parts and components are designated by the same reference numerals to avoid duplicating description.

First Embodiment

First, a first embodiment of the invention will be described while referring to FIG. 1-FIG. 5D.

Figure 1:
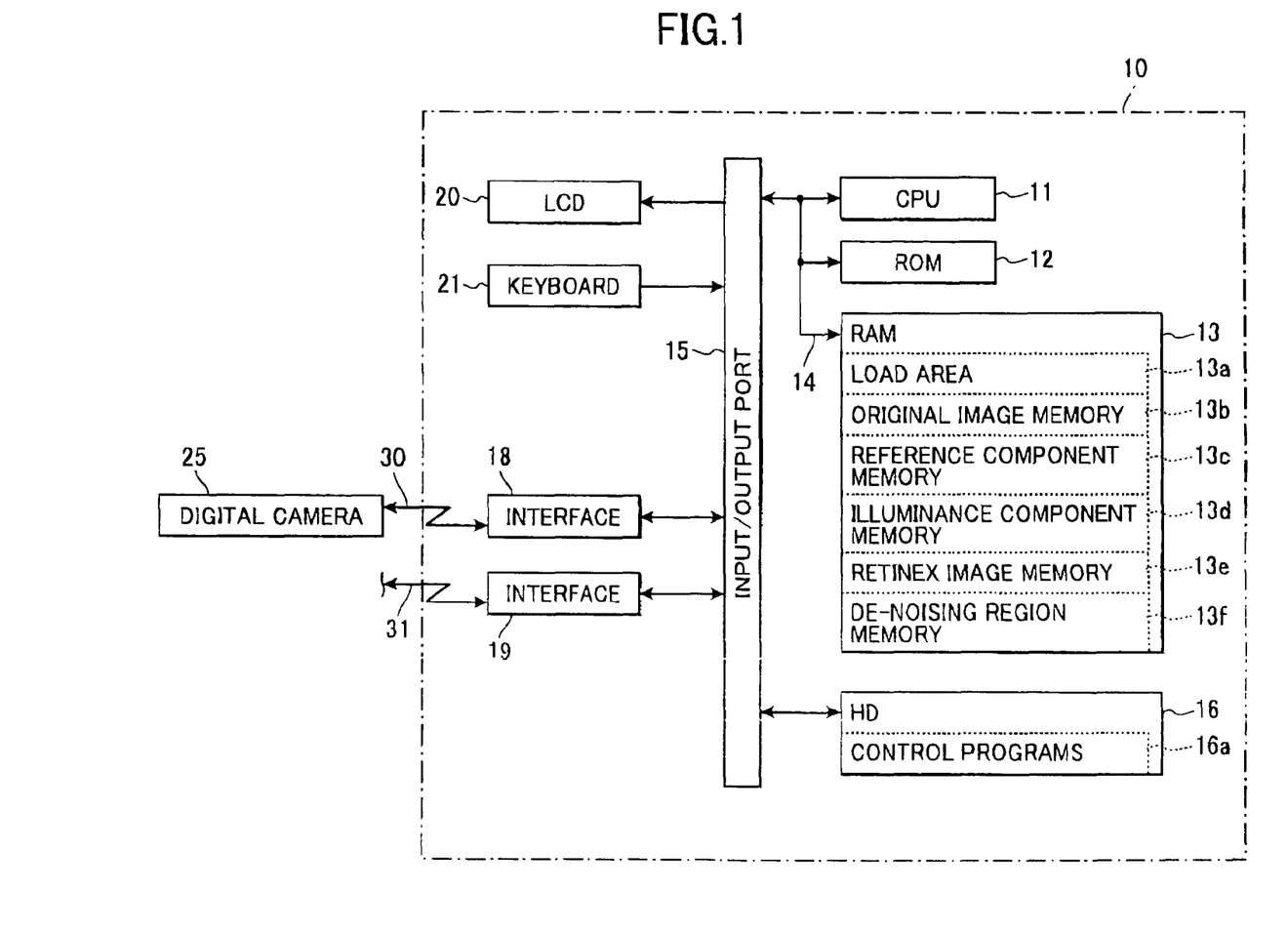
FIG. 1 is a block diagram illustrating the electrical structure of a personal computer which performs an image-processing method according to a first embodiment of the invention is installed.

FIG. 1 is a block diagram illustrating the electrical structure of a personal computer 10 which executes an image-processing method according to a first embodiment.

In the first embodiment, the personal computer 10 executes an image-processing process that employs a retinex process on target image data (the original image data or the like) to calibrate low quality regions of the image data, such as backlight regions of the image.

As shown in FIG. 1, the personal computer 10 includes a CPU 11, a ROM 12, a RAM 13, an input/output port 15, a hard disk drive 16, interfaces 18 and 19, a liquid crystal display (LCD) 20, and a keyboard 21.

The CPU 11 is an arithmetic processing device that performs various data processing based on programs stored in the ROM 12, and an operating system (OS) and various application programs stored on the hard disk drive 16. The ROM 12 is a non-writable memory for storing basic programs executed by the CPU 11, as well as various data.

The RAM 13 is a writable memory for temporarily storing data and programs that the CPU 11 requires when executing various processes. The RAM 13 includes a load area 13a, an original image memory 13b, a reference component memory 13c, an illuminance component memory 13d, a retinex image memory 13e, and a de-noising region memory 13f.

Figure 3A:
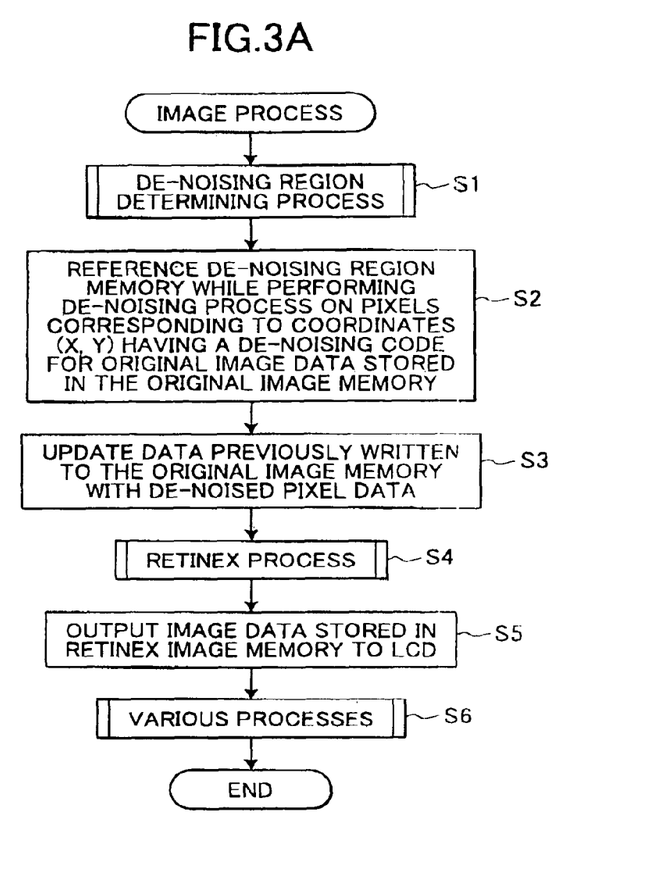
FIG. 3A is a flowchart illustrating steps in the image process executed by the personal computer.
Figure 4:
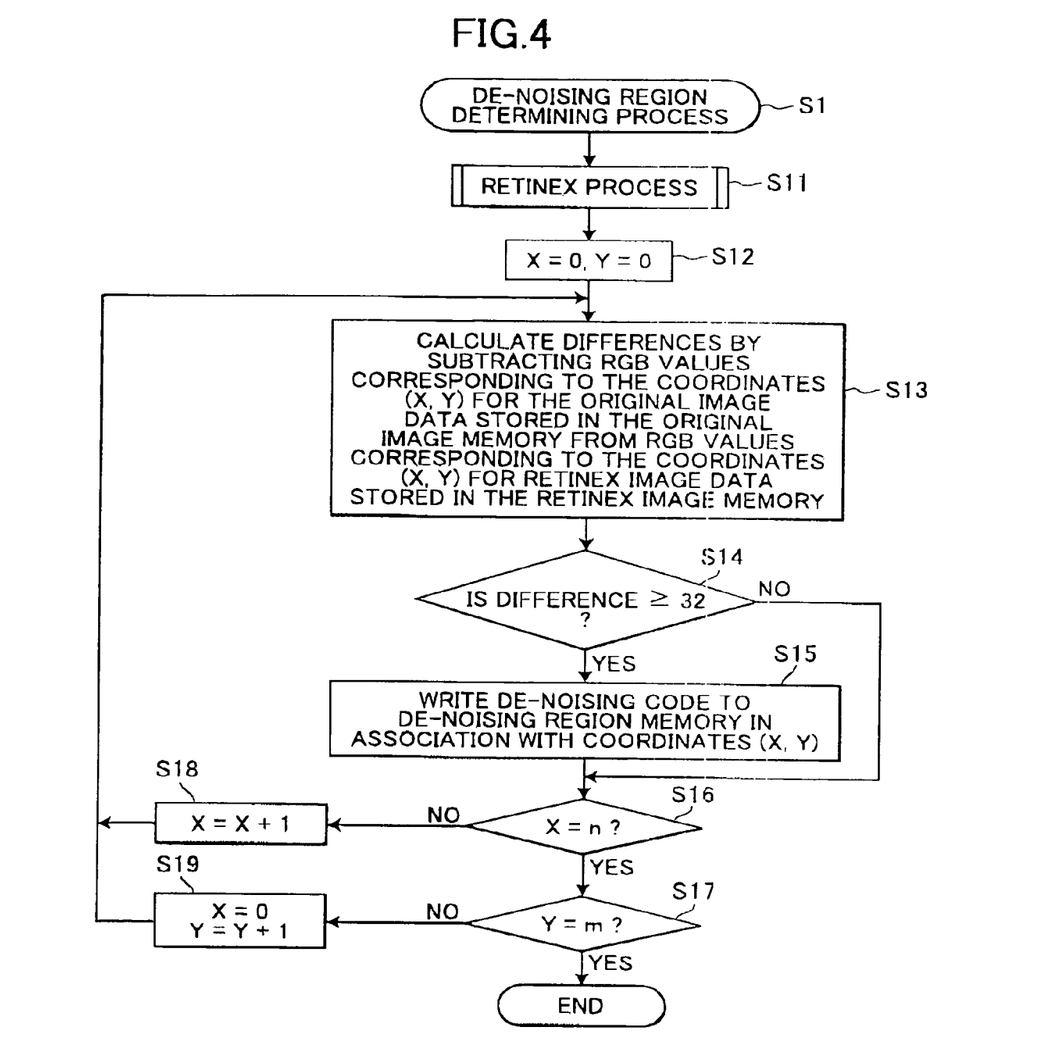
FIG. 4 is a flowchart illustrating steps in a de-noising region determining process executed during the image process of FIG. 3A.
Figure 5A:
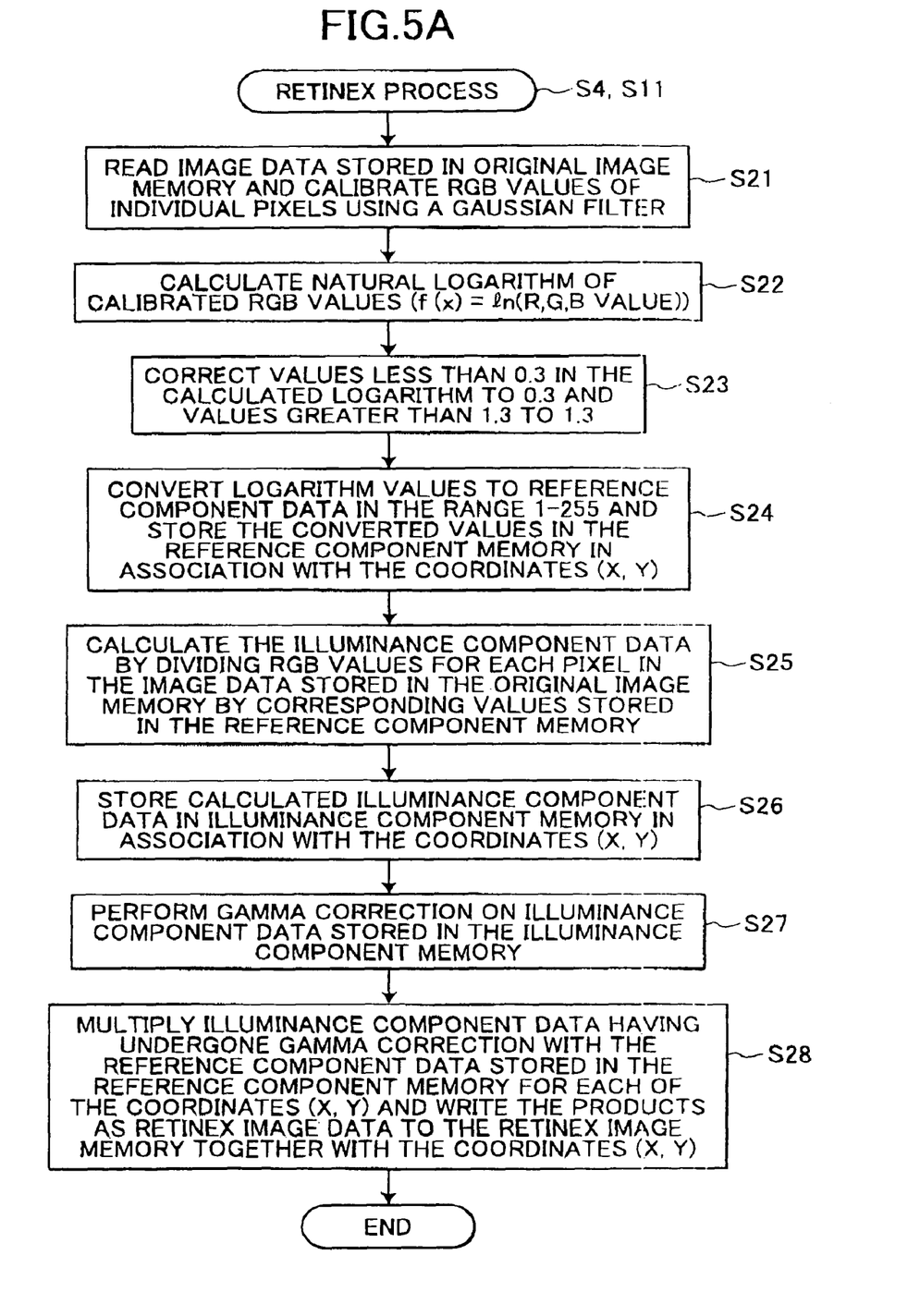
FIG. 5A is a flowchart illustrating steps in a retinex process executed during the image process of FIG. 3A and the de-noising region determining process of FIG. 4.

The load area 13a functions as a memory area for loading various programs supplied from the hard disk drive 16. Programs loaded in the load area 13a are executed by the CPU 11. Image-processing programs for the flowcharts shown in FIG. 3A, FIG. 4, and FIG. 5A are executed by the CPU 11 after being loaded from the hard disk drive 16 into the load area 13a.

The original image memory 13b functions to store image data subjected to image processing by the CPU 11. More specifically, the original image memory 13b stores original image data, which is the inputted image data, or image data resulting from removing noise from the backlight regions (low quality portions) of the original image data (selectively-noise-reduced image data). Here, original image data includes not only data inputted into the personal computer 10 from an external device, such as a digital camera 25, but also image data created on the personal computer 10.

The personal computer 10 is configured to be able to receive image data (original image data) inputted from the digital camera 25. The personal computer 10 stores the inputted image data in a prescribed area of the hard disk drive 16. By performing a prescribed operation, the user of the personal computer 10 can issue a command to perform image processing on image data stored in the hard disk drive 16. At this time, the personal computer 10 writes the user's designated image data (data for a single original image) to the original image memory 13b in order to process the designated image data.

The personal computer 10 performs image processing using the retinex process (S4) to calibrate backlight image portions of inputted image data. A de-noising process is performed to remove noise from the backlight regions of the image prior to calibrating the backlight regions with the retinex process. In other words, image data that is subjected to the retinex process to calibrate backlight regions of the image is selectively-noise-reduced image data that is produced by de-noising the backlight regions of the original image data and that is written over the original image data stored in the original image memory 13b.

The reference component memory 13c and illuminance component memory 13d function to store component values of the image data produced in the retinex process (S4, S11). The reference component memory 13c stores reference component data, and the illuminance component memory 13d stores illuminance component data.

The reference component data and illuminance component data are calculated in the retinex process. Specifically, the retinex process performs prescribed arithmetic computations on image data to produce the reference component data and illuminance component data from the image data.

More specifically, the reference component data is generated by first processing each pixel data (RGB values) of the image data with a Gaussian filter (FIG. 5B) and subsequently taking the natural logarithm. After rounding up or rounding down the calculated natural logarithm so as to specify a value in a range from the minimum value of 0.3 to the maximum value of 1.3, the value is converted to one of 255 values within the range 1-255, where 1 is the minimum value of 0.3 and 255 is the maximum value of 1.3, and the converted value is set as the reference component data.

The illuminance component data is found by dividing each pixel data in the image data by the corresponding reference component data. Since the reference component data is a value from 1 to 255 and the RGB values of the image data are values within the range 0-255, the calculated illuminance component data is a value between 0 and 255.

RGB values represent the three primary colors of light and include an R value representing red, a G value representing green, and a B value representing blue. Since each variety of color can be generated by a combination of the three primary colors of light, the color (hue, tone, etc.) of each pixel in the inputted image is represented by a combination of the R, G, and B values (RGB values). The larger the RGB values, the higher the brightness (lightness). In the first embodiment, reference component data and illuminance component data are calculated for each of the R, G, and B values and stored in the respective reference component memory 13c and illuminance component memory 13d.

The retinex image memory 13e functions to store retinex image data formed in the retinex process. The retinex image data is image data resulting from calibrating primarily the backlight regions of the original image data and formed by multiplying the reference component data generated from the original image data and the illuminance component data that has undergone gamma correction. In the image process according to the first embodiment, the retinex process is executed twice to form the output image data from the original image data. The first time the retinex process is performed in S11 (FIG. 4) for determining a de-noising region that should be de-noised. The second time the retinex process is performed in S4 (FIG. 3A) to calibrate the backlight regions of the selectively-noise-reduced image data, that is, to improve the image quality of the original image data.

Therefore, two cases of retinex image data are generated during the series of image processes. The retinex image data generated in each stage is written to and stored in the retinex image memory 13e. As a result, the retinex image data generated for determining the de-noising region is overwritten by the subsequently generated retinex image data. The retinex image data written to the retinex image memory 13e in the second retinex process (S4) is the calibrated image data (output image data) and is read from the retinex image memory 13e and displayed on the LCD 20 as the output image.

In the original image memory 13b, reference component memory 13c, illuminance component memory 13d, and retinex image memory 13e, image data, that is, pixel data is stored in association with the coordinates (X, Y) of the pixel position. The position coordinates are data indicating the position of the pixel based on a X coordinate (X) indicating the pixel position along the x-axis, and a Y coordinate (Y) indicating the pixel position along a y-axis orthogonal to the x-axis. The pixel in the top left corner is given the coordinates (0, 0). When an image is configured of 960 by 680 pixels, for example, the maximum coordinate (n) in the X coordinates is 959, while the maximum coordinate (m) in the Y coordinates is 679.

The de-noising region memory 13f functions to store the de-noising region that will be de-noised in S2 (FIG. 3A). In the image process of the first embodiment, the CPU 11 de-noises the backlight image portion. In other words, the backlight image portion corresponds to the de-noising region that is de-noised.

Since the de-noising process is executed by pixel units, the de-noising region memory 13f is configured to store a de-noising code in association with the position coordinates (X, Y) of each pixel for indicating whether calibration is to be performed on the relevant pixel. In the first embodiment, the de-noising code is a flag and is set to "1" to indicate ON. Hence, the de-noising region memory 13f stores a "1" or "0" (ON or OFF flag) for each pixel to indicate whether a de-noising process is necessary.

More specifically, a de-noising region determining process of S1 described later with reference to FIG. 4 is executed to determine whether a pixel should be de-noised, that is, whether the pixel is a backlight portion of the image. The determination is made based on the difference between the retinex image data formed from the original image data and the original image data ((pixel data from retinex image data)-(pixel data from original image data)). When the CPU 11 determines that a pixel should be de-noised, the CPU 11 stores a de-noising code of "1" in the de-noising region memory 13f in association with the coordinates (X, Y) of that pixel. The determination on whether to calibrate a pixel is performed for each of the R, G, and B values. If calibration is determined to be necessary for any of these values R, G, and B of some pixel, the de-noising code of "1" is stored in association with the subject pixel coordinates in the de-noising region memory 13f.

However, when the CPU 11 determines that some pixel need not be de-noised, that is, when the CPU 11 determines that none of the R, G, and B values for some pixel needs to be de-noised, the de-noising code of "1" is not stored in association with the subject pixel.

It is noted that all values in the de-noising region memory 13f are set to zero (0) prior to writing the de-noising codes. Accordingly, the value of "zero (0)" remains stored in association with the coordinates of pixels for which a de-noising code is not written.

In order to execute the de-noising process on those pixels that should be de-noised, the CPU 11 references the de-noising region memory 13f. If the de-noising code "1" is stored in association with the coordinates (X, Y) specifying the position of a certain pixel, then the CPU 11 executes a de-noising process on that pixel, that is, all R, G, and B values in the subject pixel data.

The CPU 11, ROM 12, and RAM 13 are connected to each other via a bus line 14 that is configured of an address bus, a data bus, control signal lines, and the like. The bus line 14 is also connected to the input/output port 15. The input/output port 15 is connected to the hard disk drive 16, interface 18 and interface 19, LCD 20, and keyboard 21.

The hard disk drive 16 is a rewritable large capacity storage medium that stores control programs 16a, including the operating system (OS) of the personal computer 10 and various application programs. Programs implementing the flowcharts in FIG. 3A, FIG. 4, and FIG. 5A are also stored in the hard disk drive 16 as part of the control programs 16a.

The interface 18 is a universal serial bus (hereinafter abbreviated as "USB"), for example. The personal computer 10 is connected to the digital camera 25 via a cable 30 connected between the interface 18 and the digital camera 25 and is capable of exchanging data and commands with the digital camera 25. As described above, image data transmitted from the digital camera 25 is stored in a prescribed region of the hard disk drive 16.

The interface 19 is also configured of a USE, for example. The personal computer 10 is connected to a printer (not shown) via a cable 31 connected between the interface 19 and the printer and is capable of transmitting image data to the printer and exchanging commands with the printer.

The interface 19 may also be configured of a LAN interface for connecting the personal computer 10 to a LAN via a LAN cable so that the personal computer 10 can exchange data and the like with other devices on the LAN (printers or other personal computers). When the personal computer 10 is connected to a LAN, other personal computers on the LAN can input image data into the personal computer 10. Further, if the LAN is connected to the Internet, the personal computer 10 can acquire image data from other personal computers, servers, or the like via the Internet.

In addition to the digital camera 25 and other personal computers on a LAN, devices for inputting image data into the personal computer 10 may include a data reader capable of reading data from a storage medium, such as a memory card, a floppy disk (registered trademark), and a magnetical optical disk (MO). The personal computer 10 may have a configuration that allows image data or various programs to be inputted into the personal computer 10 via such storage media mounted in the reader.

It is noted that the programs implementing the flowcharts in FIG. 3A, FIG. 4, and FIG. 5A may be originally stored in various types of data storage medium and downloaded to the PC 10 through the interface L9 or the data reader described above.

Next, an overview of the image process executed by the CPU 11 of the personal computer 10 will be described while referring to FIG. 2A and FIG. 2B.

Figure 2A:
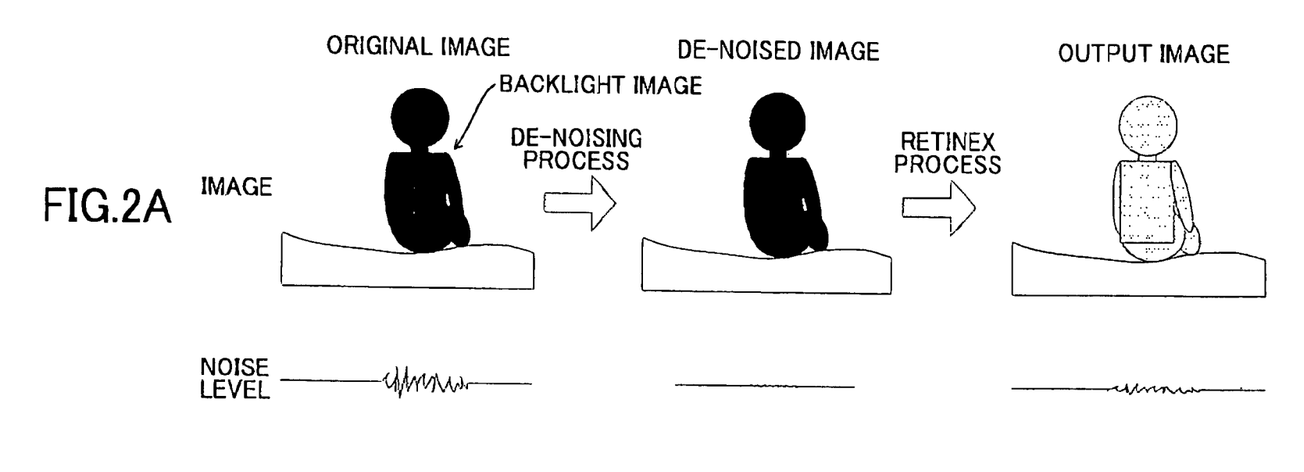
FIG. 2A is an explanatory diagram illustrating an image process executed by the personal computer in FIG. 1.
Figure 2B:
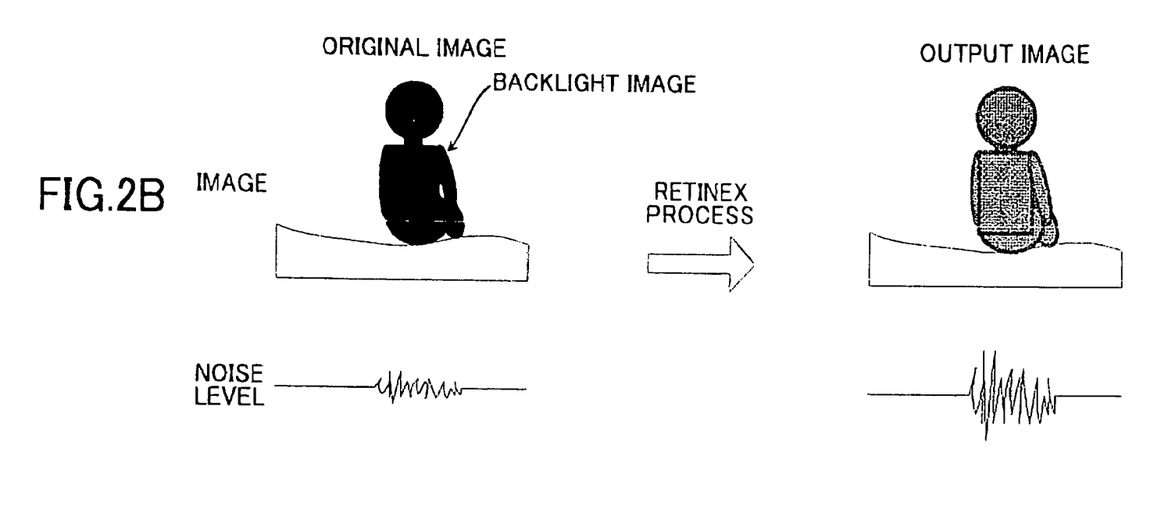
FIG. 2B is an explanatory diagram illustrating a comparative image process.

FIG. 2A is an explanatory diagram conceptually illustrating the image process executed on the personal computer 10 according to the first embodiment, while FIG. 2B shows a comparative image process employing the retinex process. In FIG. 2A and FIG. 2B, the noise level of the respective image is displayed below the image.

The left side of FIG. 2A depicts the original image (the visualized original image data or the original image data outputted to a display device), with the noise level of the original image indicated beneath the image. The black-filled portion of the image indicates the backlight portion. The signal-to-noise ratio of the image signal acquired for this backlight portion is low, indicating that the noise level is greater in the backlight portion than in other portions of the image. The backlight portion of the original image is the region targeted for the de-noising process. The backlight image portion is determined based on the difference between the original image data and the retinex image data generated during the de-noising region determining process. As shown in the center image of FIG. 2A, noise is reduced or removed by performing the de-noising process on this backlight region. The de-noising process reduces noise by averaging values of the pixel data (signal levels) at each pixel in the backlight region using values of its surrounding pixel data (signal level). In other words, the noise is reduced or removed by smoothing the difference between pixel data at the target pixel and the surrounding pixels. Thus, selectively-noise-reduced image data is obtained by executing the de-noising process only on the backlight portion of the image. Subsequently, the retinex process is performed on the thus selectively-noise-reduced image data. By executing the retinex process on the image data, it is possible to improve the lightness and contrast in the backlight image region.

It is noted that improving the lightness and contrast in the backlight image region may bring out and amplify hidden noise in this backlight region because the strength of the noise in the image data is increased a the strength of the signal in the image data is increased. However, by executing the retinex process after performing the selective noise-reducing process, the image process of the first embodiment can suppress noise amplification, even when executing the retinex process. In this way, it is possible to form a sharper output image with little noise and excellent resolution, contrast, and lightness, as indicated on the right side of FIG. 2A.

In the comparative image process shown in FIG. 2B, the retinex process also can improve the lightness and contrast of the backlight image portion when performed on the original image shown on the left side of FIG. 2B. However, the noise in this backlight region is also amplified, forming an output image with more pronounced noise, as shown in the right side of FIG. 2B.

While it is possible to execute a noise-reducing process after the retinex process, the noise-reducing process will greatly modify the image data because the noise level has been increased during the retinex process.

Further, if the noise-reducing process is such a type that attempts to reduce or remove noise by decreasing the difference between pixel data for a target pixel and surrounding pixels, it is necessary to increase the degree of smoothing on the pixel data (greatly decreasing the differences among pixel data) in order to reduce or remove the amplified noise. This will reduce the resolution of the image as a result.

Next, steps in the image process executed by the personal computer 10 will be described with reverence to FIG. 3A through FIG. 5A.

FIG. 3A is a flowchart illustrating steps in the image process executed on the personal computer 10.

The image process is executed to calibrate backlight regions of the image data by improving the image quality by increasing the contrast and lightness using the retinex process and to remove noise from the backlight regions of the image prior to the retinex process.

The image process of FIG. 3A is started when the user performs a prescribed operation for designating image data to be processed.

After the designated image data is written to the original image memory 13b as the original image data, the CPU 11 first executes in S1 a de-noising region determining process for determining a de-noising region (backlight portion of the image), that is, pixels that should be de-noised.

FIG. 4 is a flowchart illustrating steps in the de-noising region determining process of S1.

Although not indicated as a step in FIG. 4, the CPU 11 first initializes all values in the de-noising region memory 13f to zero (0). Subsequently, the CFU 11 performs a retinex process in S11.

FIG. 5A is a flowchart illustrating steps in the retinex process of S11.

As shown in FIG. 5A, in S21, the CPU 11 first reads image data stored in the original image memory 13b and calibrates the pixel data in the image data, that is, the RGB values of each pixel using a Gaussian filter.

Calibration with a Gaussian filter is a process for averaging pixel data. In this process, a weighting factor is assigned to the target pixel and each pixel surrounding the target pixel based on their positions so that the total of the weighting factors is 1. The pixel data of the target pixel is then set to an average value calculated from the pixel data with consideration for their weighting factors.

More specifically, the weighting factor for each pixel surrounding the target pixel is defined by the following formula, for example:

$$f(\Delta x, \Delta y)=\exp\{-[(\Delta x)^2+(\Delta y)^2]/2\sigma^2\}$$

wherein $\Delta x$ and $\Delta y$ indicates the distance of the surrounding pixel from the target pixel, and $\sigma$ is an arbitrary constant. Generally, the weighting factors are normalized so that the total of the weighting factors for the surrounding pixels and the target pixel will become one (1).

Figure 5B:
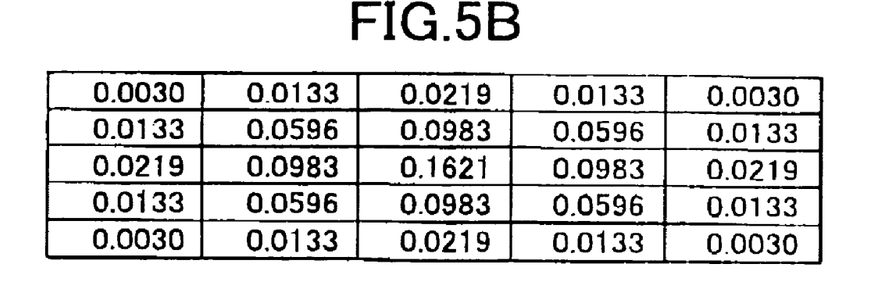
FIG. 5B shows an example of a Gaussian filter used during the retinex process of FIG. 5A.

A 5×5 matrix shown in FIG. 5B is one example of the Gaussian filter, wherein $\sigma$ is equal to one (1).

Accordingly, in S21, the pixel value at epoch pixel (target pixel (X,Y)) is set to an average value that is calculated by summing up: 0.1621×{pixel value at the target pixel (X,Y)}; 0.0983×{pixel values at four surrounding pixels (X,Y−1), (X−1,Y), (X+1,Y), and (X,Y+1)}; 0.05976×{pixel values at other four surrounding pixels (X−1,Y−1), (x+1,Y−1), (X−1, Y+1), and (X+1,Y+1); 0.0219×{pixel values at other four surrounding pixels (X, Y−2), (X−2, Y), (X+2, Y), and (X,Y+2)}; 0.0133×{pixel values at other eight surrounding pixels (X−1,Y−2), (X+1,Y−2), (X−2,Y−1), (X+2,Y−1), (X−2,Y+1), (X+2,Y+1), (X−1,Y+2), and (X+1,Y+2)}; and 0.0030× (pixel values at other four surrounding pixels (X−2, Y−2), (X+2, Y−2), (X−2, Y+2), and (X+2, Z+2)}.

It is noted that the CPU 11 performs the above-described calculation for each of the R, G, and B components.

In S22 the CPU 11 calculates, for each pixel, the natural logarithm of the pixel data that is obtained in S21.

In other words, the CPU 11 calculates the following formula:

(natural logarithm)=log$_e$(resultant pixel value obtained in S21)

It is noted that the CPU 11 performs the above-described calculation for each of the R, G, and B components.

In S23, the CPU 11 normalizes, for each pixel, the calculated logarithm value within a range of 0.3 to 1.3 by replacing the calculated logarithm value less than 0.3 with 0.3 and the calculated logarithm value exceeding 1.3 with 1.3. It is noted that the CPU 11 performs the above-described calculation for each of the R, G, and B components.

In S24 the CPU 11 converts, for each pixel, the normalized logarithm value to an 8-bit binary value in a range of 1 to 255, by converting 0.3 to "1" and 1.3 to "255," and sets the 8-bit binary value as reference component data.

More specifically, the CPU 11 multiplies the logarithm value by 255, then subtracts 75.2 from the resultant product, and then rounds down the fractional part of time calculated result, thereby obtaining a reference component value in the range of 1 to 255. In other words, the CPU 11 calculates the following formula:

(reference component value)=255×(normalized logarithm value)−75.2,

It is noted that the CPU 11 performs the above-described calculation for each of the R, G, and B components.

The CPU 11 stores the reference component data thus obtained for each pixel in the reference component memory 13c in association with the corresponding coordinate position (X, Y).

In S25 the CPU 11 calculates, for each pixel, illuminance component data by dividing the corresponding pixel data (RGB values) in the image data stored in the original image memory 13b by the corresponding reference component data (reference component data having the same coordinates (X, Y)) stored in the reference component memory 13c. Since pixel data in the image data is stored in the original image memory 13b in association with the coordinates (X, Y) of the pixel and reference (component data is stored in the reference component memory 13c in association with the coordinates (X, Y) of the pixel, the calculation in S25 is performed using the coordinates (X, Y) as an index.

In S26 the CPU 11 stores the illuminance component data calculated for each pixel in the illuminance component memory 13d in association with the coordinate positions.

In S27 the CPU 11 performs gamma correction on the illuminance component data stored in the illuminance component memory 13d for each pixel.

More specifically, for each pixel, the CPU 11 first normalizes the illuminance component data that is in the range of 0 to 255 to a value in the range of 0 to 1. For example, the CPU 11 calculates the normalized illuminance component value by dividing the illuminance component by 255.

Next, the CPU 11 calculates the following formula to execute a gamma correction on the illuminance component data:

$$\begin{pmatrix} \text{gamma-corrected} \\ \text{illuminance component} \end{pmatrix} = \begin{pmatrix} \text{illuminance} \\ \text{component} \end{pmatrix} \times \begin{pmatrix} \text{normalized} \\ \text{illuminance} \\ \text{component} \end{pmatrix}^{\gamma-1}$$

wherein the value γ is a gamma coefficient greater than zero (0) and smaller than one (1).

It is noted that the CPU 11 performs the above-described calculation for each of the R, C, and B components.

Figure 5C:
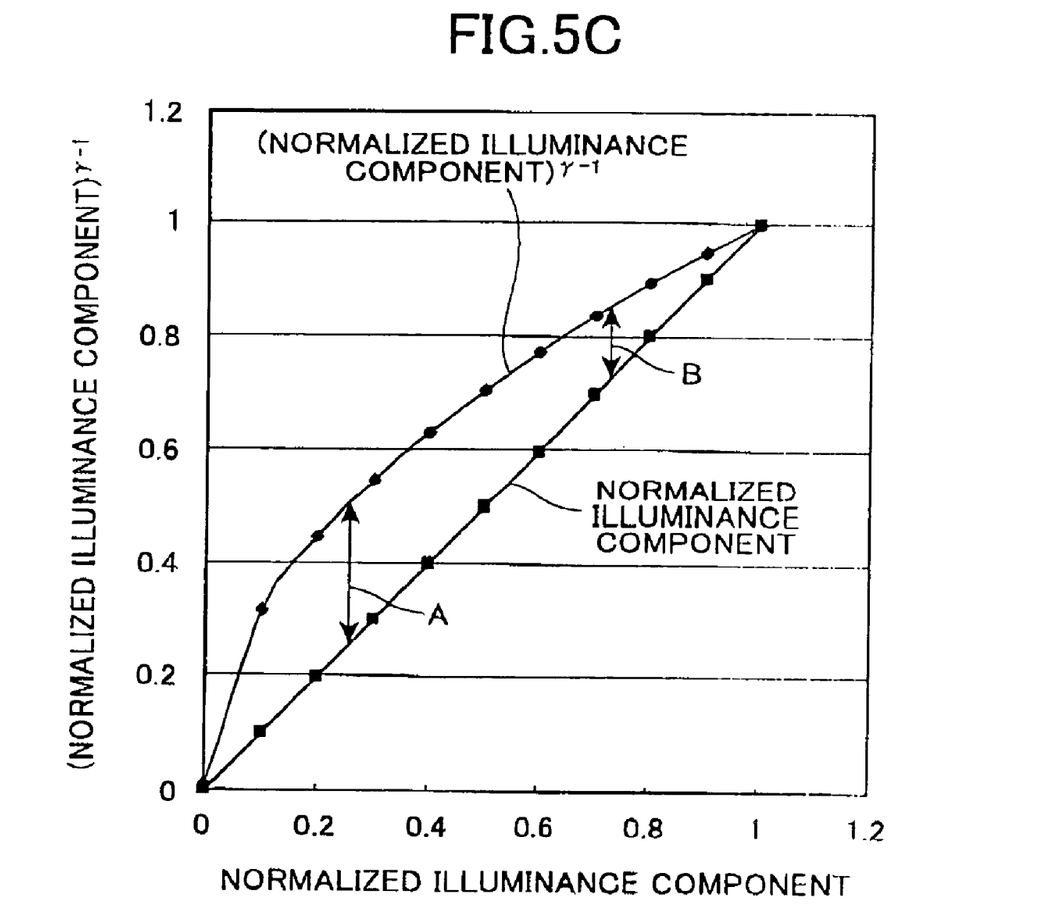
FIG. 5C shows the relationship between the normalized illuminance component value and the normalized illuminance component value raised to the $(\gamma-1)$-th power.

FIG. 5C shows the relationship between the normalized illuminance component value and the normalized illuminance component value raised to the (γ−1)-th power. As apparent from the figure, the value (normalized illuminance component)$^{\gamma-1}$ is greater than the normalized illuminance component when the normalized illuminance component is higher than zero (9) and lower than one (1). The value (normalized illuminance component)$^{\gamma-1}$ is equal to the normalized illuminance component when the normalized illuminance component is equal to zero (0) or one (1). A normalized-illuminance changing amount is now defined as an amount by which the value (normalized illuminance component) increases to the value (normalized illuminance component)$^{\gamma-1}$, that is, a difference between the value (normalized illuminance component) and the value (normalized illuminance component)$^{\gamma-1}$. As apparent from FIG. 5C, a normalized-illuminance changing amount A attained for a relatively low normalized illuminance component value is greater than another normalized-illuminance changing amount B attained for a relatively high normalized illuminance component value.

Figure 5D:
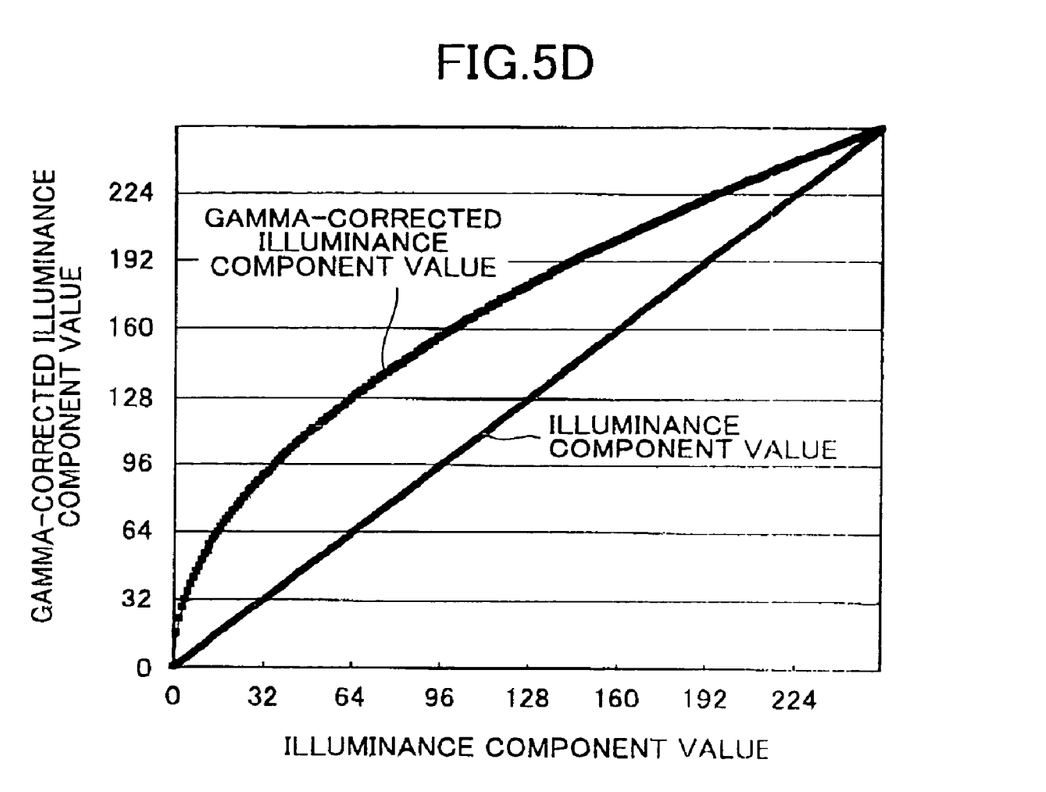
FIG. 5D shows the relationship between an illuminance component value and a gamma-corrected illuminance component value.

FIG. 5D shows the relationship between the illuminance component value and the gamma-corrected illuminance component value. As apparent from the figure, the gamma-corrected illuminance component value is greater than the illuminance component value when the illuminance component value is higher than zero (0) and lower than 255. The gamma-corrected illuminance component value is equal to the illuminance component value when the illuminance component value is equal to zero (0) or 255. An illuminance changing amount is now defined as an amount by which the illuminance component value increases to the gamma-corrected illuminance component value, that is, a difference between the gamma-corrected illuminance component and the illuminance component value. As apparent from FIG. 5D, illuminance changing amounts attained for relatively low illuminance component values are greater than other changing amounts attained for relatively high illuminance component values.

Thus, in S27, lightness in the relatively dark backlight regions is increased in a degree greater than other regions that are lighter than the backlight regions, while preventing lightness of solid black regions that originally have the illuminance component of zero (0) from being increased.

In S28 the CPU 11 multiplies, at each coordinate position, the gamma-corrected illuminance component data by the reference component data stored in the reference component memory 13c, and writes the products as retinex image data in the retinex image memory 13e in association with the corresponding coordinates (X, Y), thereby ending the retinex process of S11.

It is noted that the CPU 11 performs the above-described calculation for each of the R, G, and B components.

Next, with reference back to FIG. 4, the CPU 11 initializes in S12 variables X and Y specifying coordinates of a pixel to zero (0) (X=0, Y=0) in order to specify pixel data in the retinex image data.

In S13 the CPU 11 calculates, for each of the R, G, and B values, a difference by subtracting pixel data (RGP values) corresponding to the specified coordinates (X, Y) in the original image data stored in the original image memory 13b from pixel data (RGB values) corresponding to the specified coordinates (X, Y) in the retires image data stored in the retinex image memory 13e.

In S14 the CPU 11 determines whether the calculated difference is greater than or equal to a prescribed threshold value. The threshold value is preferably a value within a range of 32 to 64. In this example, the threshold value is set to 32. Hence, in S14 the CPU 11 determines whether the difference calculated for each of the P, G, and B values is greater than or equal to 32. In other words, the CPU 11 sets a prescribed range to a range of 0 to 31 and determines whether the differences are outside of this prescribed range.

Since the lightness in the retinex image data has been increased from the original image data, in most cases the difference obtained from subtracting the original image data from the retinex image data is a positive value. A difference greater than or equal to the prescribed threshold value indicates that the lightness has been increased more than in other areas. In this way, it is possible to determine whether the region in question (pixel in question) has been a backlight portion with low lightness in the original image data prior to calibration. Accordingly, the CPU 11 can reliably know whether the noise in the region in question (pixel in question) should be reduced.

Accordingly, if the difference for any of the R, G, and B values is greater than or equal to the threshold value of 32 (S14: YES), then in S15 the CPU 11 stores the de-noising code in the de-noising region memory 13f in association with the coordinates (X, Y) of the pixel. On the other hand, if the differences for all of the R, G, and B values are less than 32 (S14: NO), then the CPU 11 skips S15 and advances to S16. Accordingly, when the differences of the P, G, and B values are all less than the threshold value of 32, the CPU 11 does not write the de-noising code to the de-noising region memory 13f.

In S16 the CPU 11 determines whether the variable X=n, that is, whether the X coordinate of the current pixel data is the maximum coordinate n. If the X coordinate is the maximum coordinate n (S16: YES), then in S17 the CPU 11 determines whether the variable Y=m, that is, whether the Y coordinate of the current pixel data is the maximum coordinate m. If the Y coordinate is the maximum coordinate m (S17: YES), then it is known that determinations have been completed for all pixel data in the original image data, that is, for all pixels at coordinates (0, 0)-(n, m), and the de-noising region determining process of S1 ends.

On the other hand, if the X coordinate is not the maximum coordinate n (S16: NO), then it is known that the X coordinate has not yet reached the maximum coordinate. Accordingly, the CPU 11 determines that there remain pixel data for which the necessity of the de-noising process has not yet been determined, and in S18 increments the variable X by one (1) to specify the coordinates (X+1, Y) of the next pixel and returns to S13.

Further, if the CPU 11 determines in S17 that the Y coordinate is not the maximum coordinate m (S17: NO), indicating that the Y coordinate has not yet reached the maximum coordinate, then the CPU 11 determines that there is pixel data for which the necessity of the de-noising process has not yet been determined. Hence, in S19 the CPU 11 resets the variable X to 0 and increments the variable Y by one (1) to specify the coordinates (0, Y+1) of the next pixel, and returns to S13. In this way, the process for determining whether pixel data should be de-noised is performed for each pixel based on the new Y coordinate and the sequentially specified X coordinates. As a result, the process of S13-S19 is repeated until the coordinates reach the final coordinates (n, m).

Thus, after executing the de-noising region determining process in S1, de-noising codes have been stored in the de-noising region memory 13f in association with the coordinates of each pixel that has to be de-noised.

With reference backs to FIG. 3A, the CPU 11 next references in S2 the de-noising region memory 13f while performing the de-noising process on pixel data in the original image data stored in the original image memory 13b corresponding to the coordinates having the denoising code. More specifically, when a de-noising code is stored in association with some coordinates, in S2 the CPU 11 performs the de-noising process on all the R, G, and B values in the pixel data in the original image data corresponding to the subject coordinates.

In the de-noising process, the CPU 11 calculates, for each pixel with the de-noising code, an average of pixel data in a 3 by 3 matrix centered on the target pixel for de-noising and sets the pixel data for the target pixel for de-noising to the calculated average. Hence, this process reduces or removes noise by flattening pixel data for the target pixel, that is, by reducing the difference among pixel data at the target pixel and the surrounding pixels.

Figure 3B:
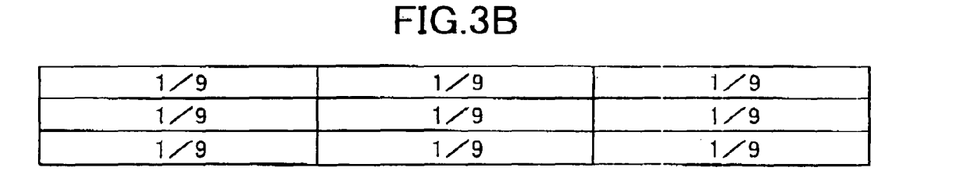
FIG. 3B shows a 3×3 matrix for a de-noising process executed during the image process of FIG. 3A.

More specifically, a 3×3 matrix shown in FIG. 3B is used in the de-noising process. A de-noised pixel value for the target pixel (X,Y) is calculated by summing up: a ninth of the original value for the target pixel (X,Y); and ninths of the original values for the eight surrounding pixels (X−1,Y−1), (X,Y−1), (X+1,Y−1), (X−1,Y), (X−1,Y), (X−1,Y+1), (X,Y+1), and (X+1,Y+1).

It is noted that the CPU 11 performs the above-described calculation for each of the R, G, and B components.

In S3 the CPU 11 overwrites pixel data (PGB values), which are stored in the original image memory 13b in association with the coordinates of pixel data that have been de-noised, with the de-noised pixel data (RGB values) to update the data previously stored in the original image memory 13b. In this way, the CPU 11 generates selectively-noise-reduced image data and overwrites the original image data stored in the original image memory 13h with the selectively-noise-reduced image data.

In S4 the CPU 11 executes another retinex process on the image data now stored in the original image memory 13b. That is, the CPU 11 executes the retinex process in S4 in the same manner as in S11 described above with reference to FIG. 5A except for the points described below.

That is, the retinex process of S4 targets the selectively-noise-reduced image data that has been obtained through the de-noising process of S2. In other words, in S21, the CPU 11 reads the selectively-noise-reduced image data that has been obtained through the de-noising process of S2 and that is now stored in the original image memory 13b. In S22-S23, the CPU 11 calculates reference component data based on the selectively-noise-reduced image data. In S24, the CPU 11 writes the reference component data over the reference component data that has been already calculated and stored in the reference component memory 13c during the retinex process of S11. In S25-S26, the CPU 11 calculates illuminance component data based on the selectively-noise-reduced image data and the newly-generated reference component data. In S26, the CPU 11 writes the illuminance component data over the illuminance component data that has been already calculated and stored in the illuminance component memory 13d during the retinex process of S11. In S27, the CPU 11 performs gamma correction on the thus newly-generated illuminance component data. In S28, the CPU 11 calculates retinex image data based on the newly-generated reference component data and the newly-gamma-corrected illuminance component data, and writes the calculated retinex image data over the retinex image data that has been already calculated and stored in the retinex image memory 13e during the retinex process of S11.

Thus, according to the retinex process of S4, original image data whose backlight regions have been already noise-reduced is calibrated to generate retinex image data, which is in turn stored in the retinex image memory 13e.

With reference back to FIG. 3A, next, in S5 the CPU 11 outputs the retinex image data stored in the retinex image memory 13e to the LCD 20. Hence, a high-quality image is displayed on the LCD 20 after the backlight regions of the original image data are de-noised and calibrated and the contrast and lighting are improved.

After executing various other processes in S6, the image process ends. Representative examples of the processes in S6 may include a printing process for performing a printing operation in response to a print command inputted by the user, modeling processes other than the retinex process, and a process to modify the hue.

As described above, using the image-processing program installed on the personal computer 10, it is possible to improve the quality of images with the retinex process and to remove noise in backlight regions of the image prior to performing the retinex process. Hence, the image process can avoid noise amplification caused by the retinex process to form higher quality images.

The retinex process of S4 for improving the quality of image data and the retinex process of S11 or extracting regions (pixels) that should be de-noised are configured with the same algorithm. Therefore, it is possible to coordinate the backlight image portions, for which image quality is calibrated in the retinex process of S4, with the portions that are determined in the de-noising region determining process of S1 as backlight image regions and that are de-noised. Hence, when calibrating the image quality in the backlight regions through the retinex process of S4, the same regions have already undergone noise reduction, enabling the formation of a high-quality output image.

In the retinex process of S11, the original image data stored in the original image memory 13b is subjected to the retinex process. Accordingly, retinex image data is generated based on the original image data and is stored in the retinex image memory 13e. The thus generated retinex image data is compared to original image data in S13-S14 in order to extract the de-noising region.

In the retinex process of S4, image data that has been selectively noise-reduced in S2 and that has been written over the original image data in the original image memory 13b in S3 is subjected to the retinex process. Accordingly, retinex image data is generated based on the selectively-noise-reduced image data and is stored in the retinex image memory 13e as being written over the retinex image data that has been generated in S11. The thus newly-generated retinex image data will be used as an output image.

Thus, the retinex processes that can enhance the lightness and contrast of backlight regions in image data is employed both for extracting the regions (pixels) targeted for the de-noising process and for improving the quality of the image data.

Second Embodiment

Next, a second embodiment of the invention will be described with reference to FIG. 6 and FIG. 7.

The image-processing method according to the first embodiment described above is configured to perform the retinex process twice for determining a region that should be de-noised and for calibrating the image. Further, both retinex processes (S4, S11) are performed on all pixel data. The image-processing method according to the second embodiment is configured to form retinex image data in the second retinex process of S40 by processing only those portions of image data that have been de-noised and by using values that are generated for the other remaining portions of the image in the first retinex process of S11 executed in the de-noising region determining process of S1.

The regions (pixels) targeted for de-noising are selected by executing the retinex process on the original image data in the de-noising region determining process of S1 and comparing the generated retinex image data to the original image data. Pixel data that has not been de-noised has not changed from the original data. Therefore, if the retinex process is performed on all pixel data in the selectively-noise-reduced image data stored in the original image memory 13b, the process will be repealed for pixel data that has not been de-noised.

The retinex process includes calibrating with the Gaussian filter, generating illuminance component data and reference component data, and performing gamma correction. Since the calibration with a Gaussian filter particularly requires complex operations, the retinex process tends to require a long processing time. Further, images tend to require a large volume of image data (pixel data) that increases as the quality of the image is improved. Although the processing time per pixel increases only slightly, the processing rate for the entire image process decreases greatly. Therefore, the image process excited on the personal computer 10 in the second embodiment avoids executing the retinex process redundantly, thereby improving the processing speed for the entire image process.

Figure 6:
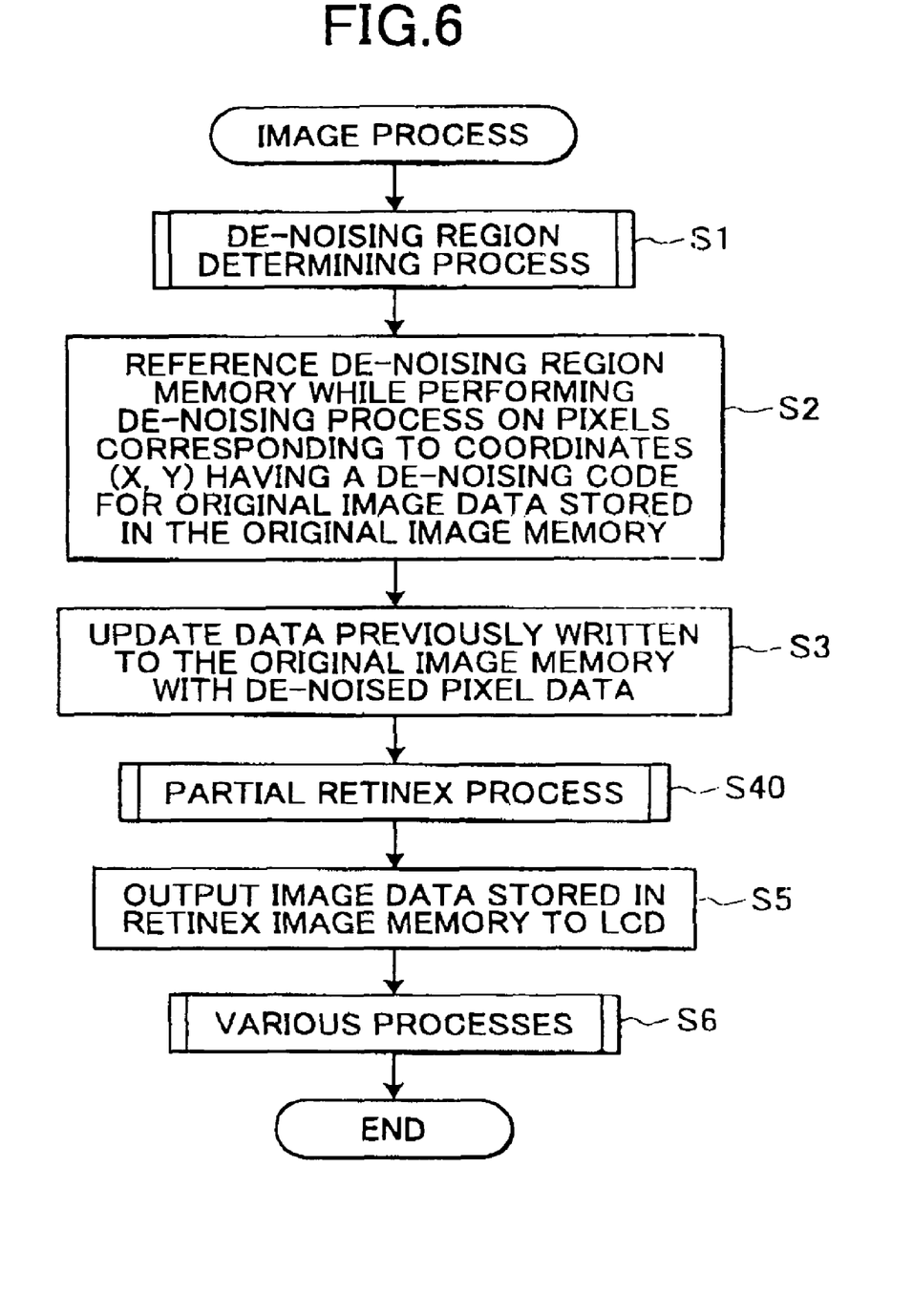
FIG. 6 is a flowchart illustrating steals in an image process executed on the personal computer according to a second embodiment of the invention.

FIG. 6 is a flowchart illustrating steps in an image process according to the second embodiment executed on the personal computer 10.

More specifically, in the same manner as in the first embodiment, the de-noising region determining process of S1 is executed to determine which pixels should be de-noised, the de-noising process of S2 is executed on pixel data for these pixels, and the corresponding pixel data in the original image stored in the original image memory 13b is replaced with the de-noised pixel data in S3.

Then, in S40, the CPU 11 executes a partial retinex process on the image data now stored in the original image memory 13b, that is, the selectively-noise-reduced image data. Through the partial retinex process of S40, the CPU 11 executes the retinex process only on pixel data that has been de-noised, rather than all pixel data stored in the original image memory 13b.

After completing the partial retinex process of S40, the CPU 11 executes the processes of S5 and S6 in the same manner as in the first embodiment. That is, the CPU 11 outputs in S5 the retinex image data stored in the retinex image memory 13e to the LCD 20. After the CFU 11 executes various other processes in S6, the image process according to the second embodiment ends.

Figure 7:
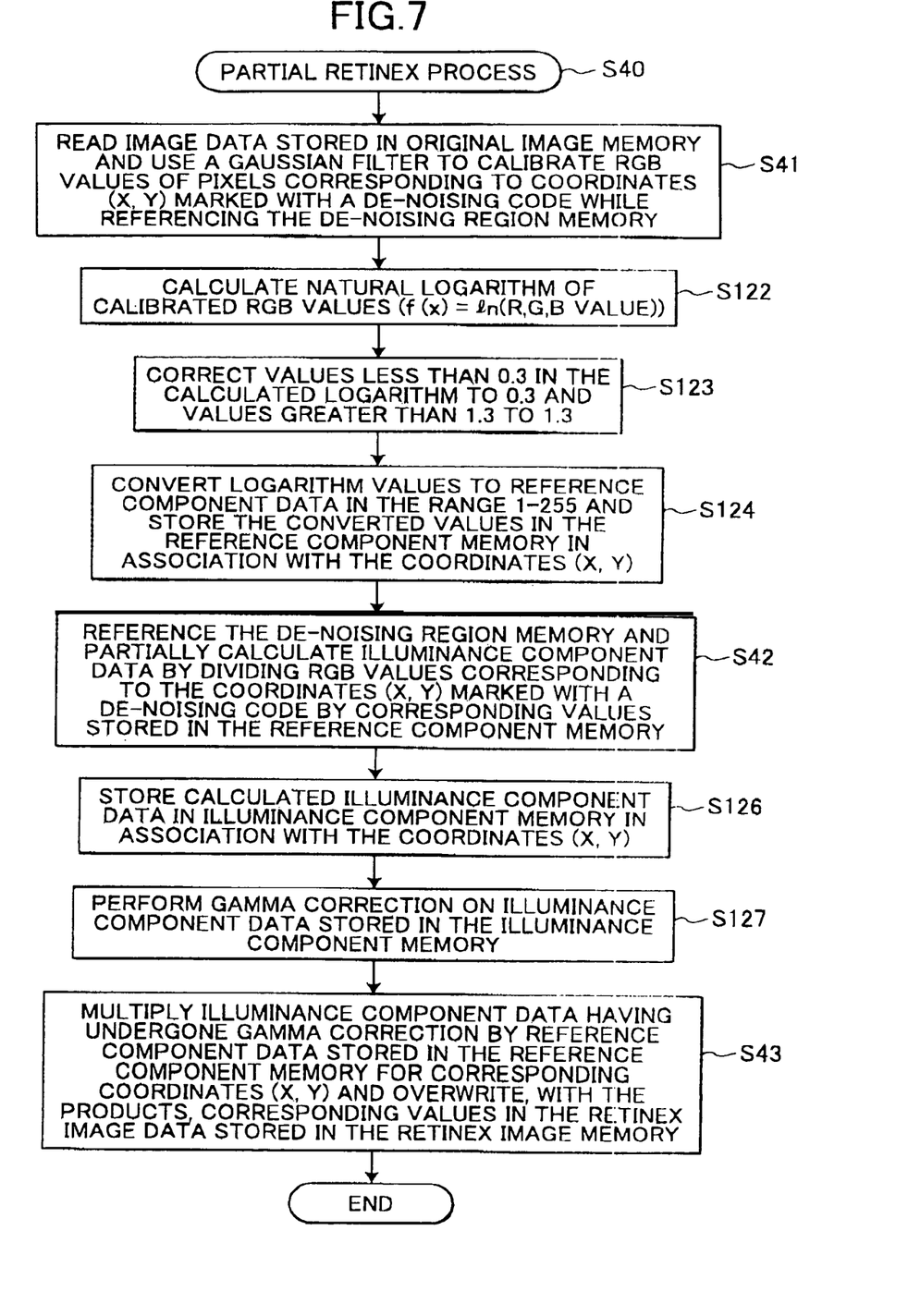
FIG. 7 is a flowchart illustrating steps in a partial retinex process executed during the image process of FIG. 6.

FIG. 7 is a flowchart illustrating the partial retinex process of S40 executed during the image process in FIG. 6. As described above, the partial retinex process of S40 is configured for performing the retinex process only on pixel data that has been de-noised.

In S41 of the partial retinex process of S40, the CPU 11 first reads image data that has been subjected to processes of S1-S3 and that is now stored in the original image memory 13b. While referencing the de-noising region memory 13f, the CPU 11 performs calibration with the Gaussian filter only on those pixel data (RGP values) that correspond to coordinates (X, Y) marked with the de-noising code.

Then, in S122-S124, the CPU 11 calculates reference component data and stores the reference component data in the reference component memory 13c. The processes S122-S124 are the same as S22-S24 of the first embodiment except that the CPU 11 calculates reference component data only for coordinates (X, Y) marked with the de-noising code.

Next, in S42 the CPU 11 references the de-noising region memory 13f to calculate illuminance component data by dividing each pixel data (RGB values) corresponding to coordinates (X, Y) marked with the de-noising code in the image data stored in the original image memory 13b by the corresponding reference component data (reference component data having the same coordinates (X, Y)) that is now stored in the reference component memory 13c. Through this process, the CPU 11 generates illuminance component data only for the portions of selectively-noise-reduced image data that differ from the original image data.

In S126 the CPU 11 stores the generated illuminance component data in the illuminance component memory 13d in association with the coordinates marked with the de-noising code in the same manner as in S26 in the first embodiment.

In S127, gamma correction is executed in the same manner as in S27 in the first embodiment on the illuminance component data that is now stored in the illuminance component memory 13d for the coordinates marked with the de-noising code.

Next, in S43 the CPU 11 multiplies, for each of the coordinates marked with the de-noising code, the illuminance component data having undergone gamma correction in S127 by the reference component data that is now stored in the reference component memory 13c and that corresponds to this illuminance component data and overwrites, with these products (retinex image data), the corresponding values stored in the retinex image memory 13e. Subsequently, the partial retinex process of S40 ends.

As described above, the image process executed on the personal computer 10 in the second embodiment performs the retinex process only on pixel data that has been de-noised (partial retinex process of S40), rather than performing the retinex process on all pixel data in the image data stored in the original image memory 13b, and substitutes or uses the retinex image data already generated in the de-noising region determining process of S1 for portions of the image that have not been de-noised. In this way, the image process avoids performing the retinex process redundantly, thereby reducing the length of the process end increasing the processing speed.

While the invention has been described in detail with reference to the above aspects thereof, it would be apparent to those skilled in the art that various changes and modifications may be made therein without departing from the spirit of the invention.

For example, while the RGB format is used as the color system in the embodiments, the invention may be applied to a color system other than the RGB format, such as the Lab format.

In the embodiments described above, the de-noising region determining process of S1 is configured for determining which pixel data should be de-noised by comparing a difference for each of the R, G, and B values between the retinex image and the original image to a threshold value. However, as an alternative, the de-noising region determining process may be configured to determine which pixel data should be de-noised by generating, for each pixel, brightness values (brightness value=0.3 R value+0.6 G value+0.1 B value) from the RGB values in the retinex image data and from the RGB values in the original image data, and to determine whether the difference in brightness values is greater than or equal to a threshold value.

Further, in the embodiments described above, the de-noising region determining process of S1 is configured to determine which of the pixel data should be de-noised based on each of the R, G, and B values in each pixel data. Further, the image process is configured to perform the de-noising process on all of the R, G, and B values when the difference for at least one of the R, G, and B values is greater than or equal to the threshold value of 32 (S14: YES). However, the image process may be modified to omit the de-noising process for R, G, or B values, for which the difference is smaller than the threshold value of 32, thereby improving the processing speed.

Further, in the embodiments described above, the CPU 11 can identify the regions (pixels) that should be de-noised by storing a de-noising code in association with the coordinates (X, Y) for individual pixels. However, as an alternative, it is possible to specify data indicating a region that should be de-noised, rather than individual pixels that should be de-noised. For example, it is possible to specify coordinates (X, Y) for both ends of a range that should be de-noised and to execute the de-noising process between the indicated coordinates.

Further, in the embodiments described above, in S11, the backlight regions are calibrated through the retinex process. However, in S11, the backlight regions may be calibrated through lightness calibrating processes other than the retinex process.

Further, the region to be de-noised need not be determined based on differences between the original image data and the image data whose backlight regions have been calibrated. For example, the region to be de-noised may be set to an arbitrary range specified by the user as the backlight region or may be determined based on differences in lightness between the target pixel and pixels surrounding the target pixel, thereby improving the processing speed for the overall image process.

In the image process of the embodiments described above, the CPU 11 first determines which pixels must be de-noised in the de-noising region determining process of S1 and stores the determination results in the de-noising region memory 13f. Next, the CPU 11 performs the de-noising process on individual pixels based on the determination results stored in the de-noising region memory 13f. However, as an alternative, the CPU 11 may determine which pixels should be de-noised simultaneously when executing the de-noising process, eliminating the need for the de-noising region memory 13f. This process also improves the processing speed for the overall image process by eliminating the need to initialize flags in the de-noising region memory 13f and to write data to the de-noising region memory 13f.

What is claimed is:

1. An image-processing method, comprising:
    subjecting original image data indicative of an original image to a selective noise reduction by reducing noise from pixel data that meets a prescribed condition among all the pixel data in the original image data, thereby generating selectively-noise-reduced original image data indicative of a selectively-noise-reduced original image;
    performing a first calibration to calibrate contrast of a backlight region of the selectively-noise-reduced original image by determining a first pixel component and a second pixel component for each of at least noise-reduced pixel data in the selectively-noise-reduced original image data, by increasing contrast of the second pixel component, and by recreating pixel data based on the first pixel component and the calibrated second pixel component, thereby generating output image data;
    performing a second calibration to calibrate contrast of the backlight region of the original image;
    calculating a difference between pixel data in the original image data and corresponding pixel data in the contrast-calibrated original image data;
    selecting, among all the pixel data in the original image data pixel data whose corresponding pixel data in the contrast-calibrated original image data has lightness greater than the subject pixel data in the original image data and an amount of the difference is outside a preset range; and
    determining the selected pixel data as the pixel data that meets the prescribed condition.

2. The image-processing method according to claim 1, wherein the second calibration is performed by determining the first pixel component and the second pixel component for each pixel data in the original image data, by increasing contrast of the second pixel component, and by recreating pixel data based on the first pixel component and the calibrated second pixel component.

3. The image-processing method according to claim 2, wherein the performing the second calibration comprises: setting each pixel data among all the pixel data in the original image data as pixel data to be subjected to a contrast calibration; and executing the contrast calibration on the set pixel data, wherein the performing the first calibration comprises: setting each pixel data among all the pixel data in the selectively-noise-reduced original image data as pixel data to be subjected to another contrast calibration; and executing the another contrast calibration on the set pixel data, and wherein each of the contrast calibration and the another contrast calibration comprises: determining a first pixel component and a second pixel component for each pixel data in the set pixel data; increasing contrast of the second pixel component; and recreating pixel data based on the first pixel component and the calibrated second pixel component.

4. The image-processing method according to, claim 2,
wherein the performing the second calibration comprises:
setting each pixel data among all the pixel data in the original image data as pixel data to be subjected to a contrast calibration; and
executing the contrast calibration on the set pixel data,
wherein the performing the first calibration comprises:
setting noise-reduced pixel data in the selectively-noise-reduced original image data as pixel data to be subjected to another contrast calibration; and
executing the another contrast calibration on the set pixel data, while failing to execute the another contrast calibration on other remaining noise-non-reduced pixel data in the selectively-noise-reduced original images data,
wherein each of the contrast calibration and the another contrast calibration comprises:
determining a first pixel component and a second pixel component for each pixel data in the set pixel data;
increasing contrast of the second pixel component; and
recreating pixel data based on the first pixel component and the calibrated second pixel component, and
wherein the performing the first calibration further comprises:
combining the contrast-calibrated pixel data obtained for the noise-reduced pixel data in the selectively-noise-reduced original image data and the contrast-calibrated pixel data obtained for the pixel data in the original image data that corresponds to the other remaining noise-non-reduced pixel data, thereby generating the output image data.

5. The image-processing method according to claim 3, wherein each of the contrast calibration and the another contrast calibration is a retinex process.

6. The image-processing method according to claim 5,
wherein the determining the first pixel component and the second pixel component comprises:
performing a Gaussian-filter-calibration on each pixel data in the set pixel data using a Gaussian filter; generating reference component data indicative of the first pixel component based on a logarithm calculated for the Gaussian-filter-calibrated pixel data; and
generating illuminance component data indicative of the second pixel component by dividing the subject pixel data by the reference component data,
wherein the increasing contrast of the second pixel component comprises:
executing a gamma correction or the illuminance component data by using a gamma coefficient greater than zero (0) and smaller than one (1), and wherein the recreating pixel data comprises:
multiplying the reference component data by the gamma-corrected illuminance component data.

7. The image-processing method according to claim 4, wherein each of the contrast calibration and the another contrast calibration is a retinex process.

8. The image-processing method according to claim 7,
wherein the determining the first pixel component and the second pixel component comprises:
performing a Gaussian-filter-calibration on each pixel data in the set pixel data using a Gaussian filter; generating reference component data indicative of the first pixel component based on a logarithm calculated for the Gaussian-filter-calibrated pixel data; and
generating illuminance component data indicative of the second pixel component by dividing the subject pixel data by the reference component data,
wherein the increasing contrast of the second pixel component comprises:
executing a gamma correction on the illuminance component data by using a gamma coefficient greater than zero (0) and smaller than one (1), and
wherein the recreating pixel data comprises:
multiplying the reference component data by the gamma-corrected illuminance component data.

9. A non-transitory storage medium storing a set of program instructions executable on a data processing device and usable for image-processing, the set of instructions comprising:
subjecting original image data indicative of an original image to a selective noise reduction by reducing noise from pixel data that meets a prescribed condition among all the pixel data in the original image data, thereby generating selectively-noise-reduced original image data indicative of a selectively-noise-reduced original image;
performing a first calibration to calibrate contrast of a backlight region of the selectively-noise-reduced original image by determining a first pixel component and a second pixel component for each of at least noise-reduced pixel data in the selectively-noise-reduced original image data, by increasing contrast of the second pixel component, and by recreating pixel data based on the first pixel component and the calibrated second pixel component, thereby generating output image data;
performing a second calibration to calibrate contrast of the backlight region of the original image;
calculating a difference between pixel data in the original image data and corresponding pixel data in the contrast-calibrated original image data;
selecting, among all the pixel data in the original image data, pixel data whose corresponding pixel data in the contrast-calibrated original image data has lightness greater than the subject pixel data in the original image data and an amount of the difference is outside a preset range; and
determining the selected pixel data as the pixel data that meets the prescribed condition.

10. The storage medium according to claim 9, wherein the second calibration is performed by determining the first pixel component and the second pixel component for each pixel data in the original image data, by increasing contrast of the second pixel component, and by recreating pixel data based on the first pixel component and the calibrated second pixel component.

11. The storage medium according to claim 10,
wherein the performing the second calibration comprises:

setting each pixel data among all the pixel data in the original image data as pixel data to be subjected to a contrast calibration; and
executing the contrast calibration on the set pixel data,
wherein the performing the first calibration comprises:
setting each pixel data among all the pixel data in the selectively-noise-reduced original image data as pixel data to be subjected to another contrast calibration; and
executing the another contrast calibration on the set pixel data, and
wherein each of the contrast calibration and the another contrast calibration comprises:
determining a first pixel component and a second pixel component for each pixel data in the set pixel data;
increasing contrast of the second pixel component; and
recreating pixel data based on the first pixel component and the calibrated second pixel component.

12. The storage medium according to claim 10,
wherein the performing the second calibration comprises:
setting each pixel data among all the pixel data in the original image data as pixel data to be subjected to a contrast calibration; and
executing the contrast calibration on the set pixel data,
wherein the performing the first calibration comprises:
setting noise-reduced pixel data in the selectively-noise-reduced original image data as pixel data to be subjected to another contrast calibration; and
executing the another contrast calibration on the set pixel data, while failing to execute the another contrast calibration on other remaining noise-non-reduced pixel data in the selectively-noise-reduced original image data,
wherein each of the contrast calibration and the another contrast calibration comprises:
determining a first pixel component and a second pixel component for each pixel data in the set pixel data;
increasing contrast of the second pixel component; and
recreating pixel data based on the first pixel component and the calibrated second pixel component, and
wherein the performing the first calibration further comprises:
combining the contrast-calibrated pixel data obtained for the noise-reduced pixel data in the selectively-noise-reduced original image data and the contrast-calibrated pixel data obtained for the pixel data in the original image data that corresponds to the other remaining noise-non-reduced pixel data, thereby generating the output image data.

13. The storage medium according to claim 11, wherein each of the contrast calibration and the another contrast calibration is a retinex process.

14. The storage medium according to claim 13,
wherein the determining the first pixel component and the second pixel component comprises:
performing a Gaussian-filter-calibration on each pixel data in the set pixel data using a Gaussian filter; generating reference component data indicative of the first pixel component based on a logarithm calculated for the Gaussian-filter-calibrated pixel data; and
generating illuminance component data indicative of the second pixel component by dividing the subject pixel data by the reference component data,
wherein the increasing contrast of the second pixel component comprises:
executing a gamma correction on the illuminance component data by using a gamma coefficient greater than zero (0) and smaller than one (1), and
wherein the recreating pixel data comprises:
multiplying the reference component data by the gamma-corrected illuminance component data.

15. The storage medium according to claim 12, wherein each of the contrast calibration and the another contrast calibration is a retinex process.

16. The storage medium according to claim 15,
wherein the determining the first pixel component and the second pixel component comprises:
performing a Gaussian-filter-calibration on each pixel data in the set pixel data using a Gaussian filter; generating reference component data indicative of the first pixel component based on a logarithm calculated for the Gaussian-filter-calibrated pixel data; and
generating illuminance component data indicative of the second pixel component by dividing the subject pixel data by the reference component data,
wherein the increasing contrast of the second pixel component comprises:
executing a gamma correction on the illuminance component data by using a gamma coefficient greater than zero (0) and smaller than one (1), and
wherein the recreating pixel data comprises:
multiplying the reference component data by the gamma-corrected illuminance component data.

* * * * *